May 22, 1945.  P. F. SKOOG  2,376,457
LOADING MECHANISM
Filed Dec. 7, 1942  2 Sheets-Sheet 1

PER F. SKOOG
INVENTOR
ATTORNEY

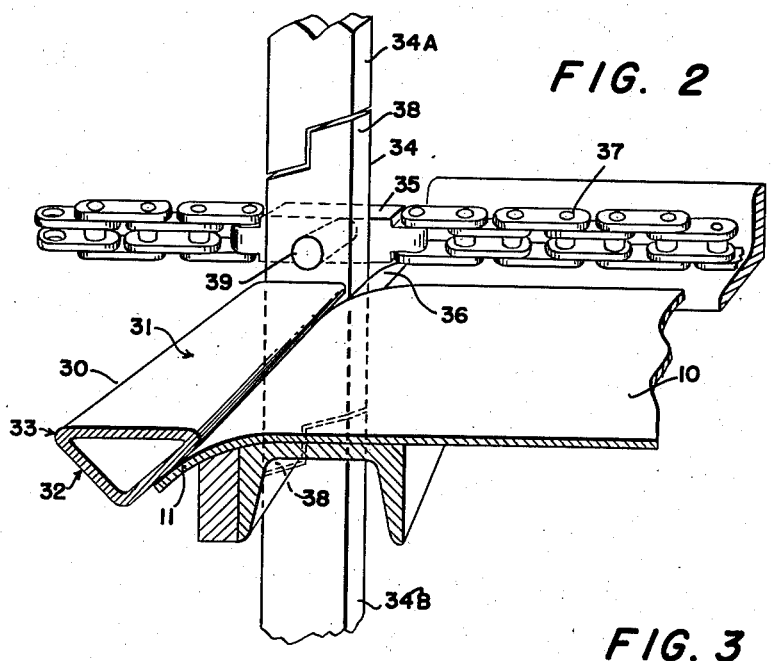
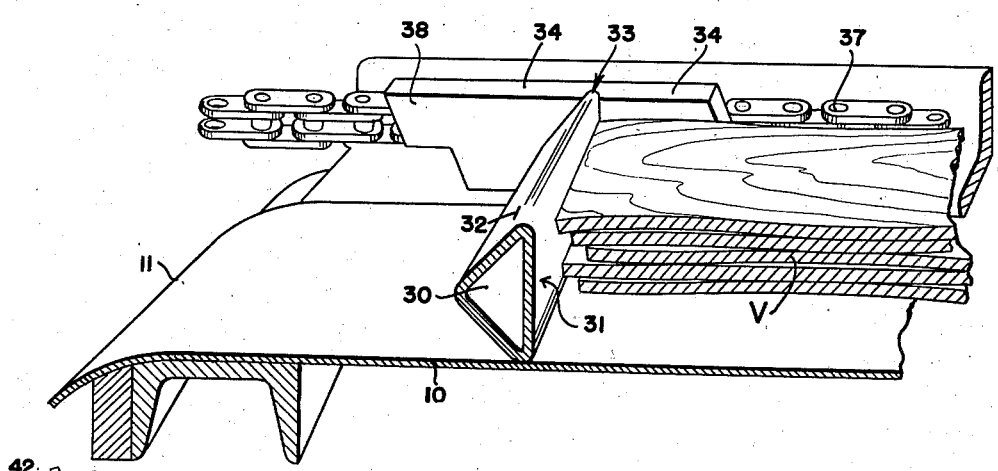
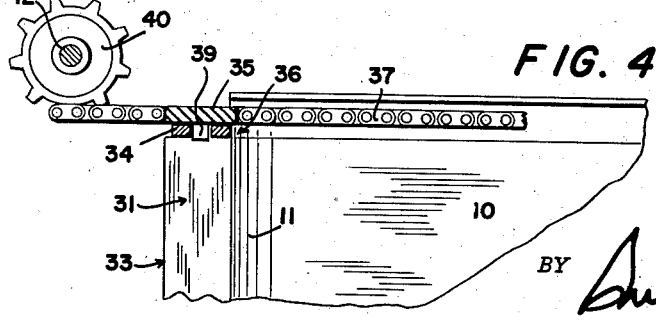
PER F. SKOOG
INVENTOR

Patented May 22, 1945

UNITED STATES PATENT OFFICE 2,376,457

LOADING MECHANISM

Per F. Skoog, Olympia, Wash.

Application December 7, 1942, Serial No. 468,092

3 Claims. (Cl. 198—222)

This invention relates to a loading mechanism and is more particularly applicable to loading mechanisms employed in the handling of sheet material for introduction to drying, pressing or other processing equipment. In the following description of my invention, the loading mechanism to which it relates is described in connection with the handling of wooden veneer sheets in their introduction to drying presses for the completion of their adhesive joinder. It will be obvious, however, that the invention is not to be limited by this description, as it is applicable to a variety of uses.

Loading mechanisms capable of laterally moving sheet material are known in the prior art, but it has been the experience of many that such loading mechanisms are materially limited in their usefulness or impose limitations upon the operations to which they pertain that materially retard and hinder those operations. A known loader of this prior art provides loading plates for receiving and directing sheet material in its forward advancement and in which is employed a pusher bar for sweeping said plate on occasion. One of the principal difficulties of this prior art arrangement is that this pusher bar is so disposed that it materially interferes with the introduction of sheet material to the loading plate, to the end that the performance of the operation is not fully satisfactory.

Having in mind the defects of the prior art loading mechanisms, it is an object of my invention to provide a loading mechanism that, without hindrance, readily receives and advances the sheet material during its operation.

Another object of my invention is to provide, in a loader of the type described, a pusher means which is normally positioned so as not to hinder the introduction of sheet material to loading plates employed in the mechanisms and yet is readily movable to its operating position when desired.

A still further and more specific object of my invention is to provide, in a mechanism of the type described, a material advancing element that serves as a deflecting nosing for the loading plate of the mechanism, and which does not deleteriously affect the introduction of sheet material to the loading plate, but rather enhances this operation.

The foregoing objects and others ancillary thereto I prefer to accomplish as follows:

According to a preferred embodiment of my invention, I provide a pusher bar which is normally positioned along a receiving edge of a loading plate to form an extension thereof and to provide a nosing therefor. Specifically, the pusher bar is coupled to draft means which, in conjunction with means for positioning the bar above the loading plate, causes the bar to sweep the loading plate and to advance objects disposed thereon across and off the plate for further handling and processing operations. The means employed for moving the pusher bar from its normal position to its operating position is an important phase of my invention, and includes camming and cam follower surfaces for swinging the pusher bar from its normal to its operating position. More specifically, a link, coupled to the pusher bar, has a cam-following surface which operates in conjunction with a cam surface having a fixed relation to the loading plate. The link is pivotally connected to draft means and is caused, by movement of the draft means forwardly, to shift the pusher bar to its operating position. Simultaneously with forward movement of the draft means, the link and bar is advanced to cause the bar to sweep the loading plate.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which Figure 1 is a perspective view, with portions broken away for convenience of illustration, of a loading mechanism typical of the type to which my invention relates, and showing in connection therewith pressing means to which sheet material is advanced by means of my invention;

Figure 2 is an enlarged fragmentary perspective view showing in detail the principal elements of my invention, with portions omitted and others shown in section for convenience of illustration;

Figure 3 is a perspective view similar to Figure 2, but with the pusher bar in its operating position; and Figure 4 is a fragmentary plan view of the pushing element of my invention.

Figure 1:
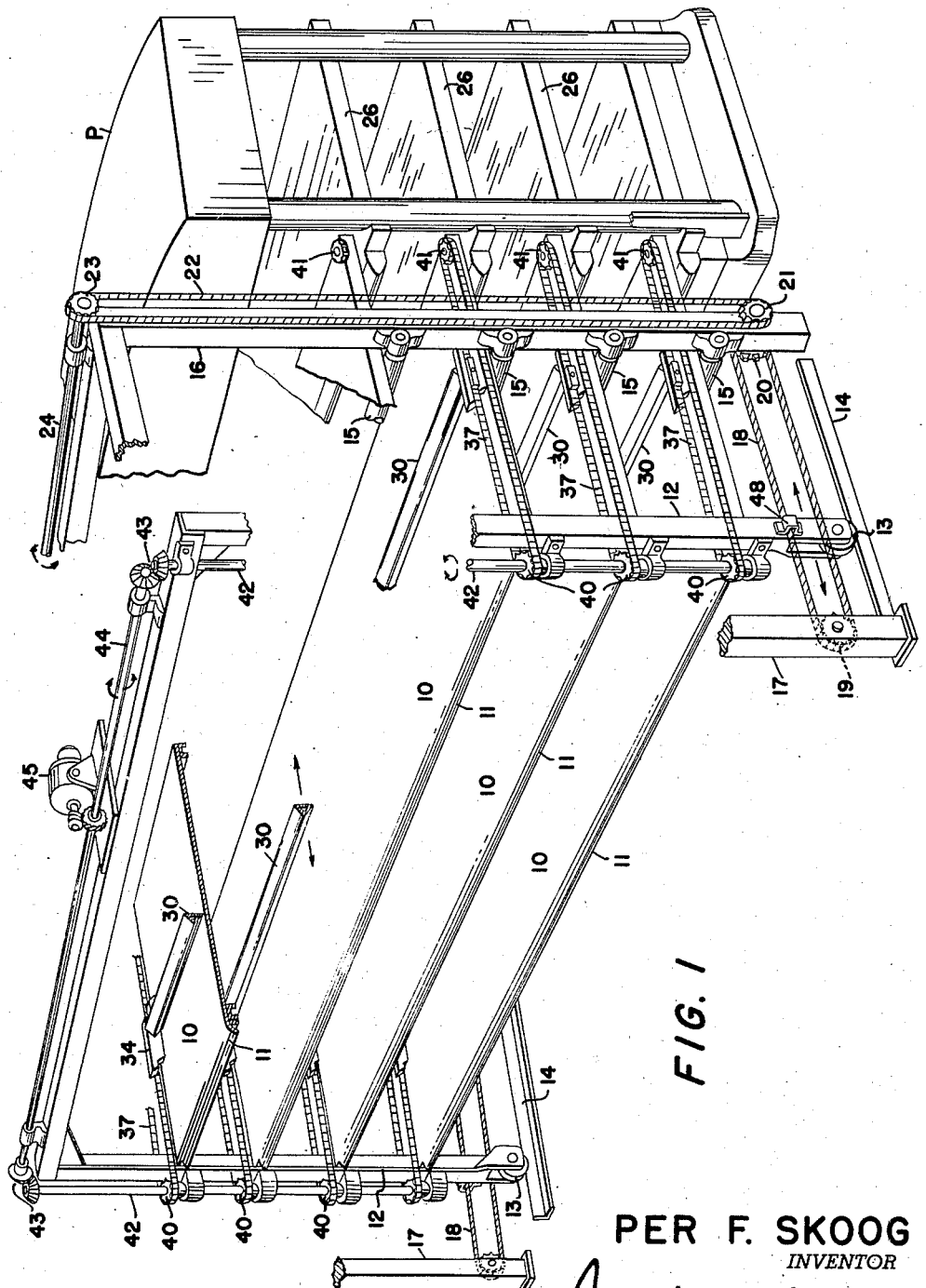

A loading mechanism, to overcome the defects hereinbefore enumerated, must have at least two totally distinct characteristics; it must be capable of presenting no hindrance to the handling of sheet material; and it must also be capable of operating to advance sheet material rapidly and efficiently in the manner to be desired, but heretofore unobtainable. Accordingly, a preferred embodiment of my invention is shown in Figure 1 in connection with a loader which comprises a plurality of loading plates 10 that are generally rectangular in shape, each having a downturned nose 11, and each attached near the ends of this downturned nose, to upright legs 12, 12 at either end. The lower end of each leg 12 is provided with a caster wheel 13 that rides upon a suitable track 14 during advancing and retracting movement of the loader. The forward portion of each loading plate 10 is supported upon rollers 15, 15 that are in turn rotatably supported by the upright frame member 16, one of which is provided at each end of the rollers. In spaced relation to the frame member 16 are similar paired frame members 17, 17. Between members 16 and 17 a sprocket chain 18 is mounted to pass over end sprockets 19 and 20. Power is applied to sheave 20 through the drive sprocket 21 by means of the drive chain 22, which rises above sprocket 21 to sprocket 23 that may be driven reciprocally by means of a drive shaft 24 to which power is supplied in any conventional manner. One flight of chain 18 is attached by clip 48 to the leg 12.

From the foregoing it will be seen that a plurality of loading trays 10 are maintained in a horizontal positioning with respect to the supporting surface, and are caused to advance and retract into spaces between the pressure plates 26 of the press P.

On desired occasions in the operation of the loader mechanism, a pusher bar 30 is caused to sweep the upper surface of each loading plate 10.

As can be seen in Figure 2, and in other views as well, the pusher bar 30 has a surface 31 which, in the normal position of the pusher bar, lies in alignment with the upper surface of the loading plate 10. Angularly disposed to surface 31 is a surface 32 and the juncture 33 of surfaces 31 and 32 forms a tapered nosing for the edge of the loading plate to guide veneer pack V to the loading surface.

At one or both ends the pusher bar has a link 34 which has a face forming a cam-following surface for cooperative movement over the camming surface 36 that is provided in fixed relation to the loading plate. A pivot pin 39 swingingly joins the link 34 to a draft link 35 that is in turn coupled to a draft chain 37.

Each end of the link 34 has an interlocking tongue 38 and the tongues in each link are in opposed reation. Where a plurality of loading plates, as in Figure 1, is provided, when the links are in the erect position of Figure 2, each link will interlock with a similar upper and lower cam-following link (here designated as 34a and 34b).

At either edge of the loading plate, the endless draft chain 37 passes over drive sprockets 40 and idler sprockets 41. The sprockets 40 are coupled to a suitably journaled pillar shaft 42 which at its upper end, through a pair of bevel gears 43, has power applied from drive shaft 44 that is driven by a motor 45 or other means. In the showing of Figure 1 each end of the pusher bar 30 is thus powered for advancing and retracting movement over the upper surface of the loading plate to and from the normal position.

It is customary in the operation of loading plywood packs V to a press P to first insert a pack of plywood sheets to each of the loading plates, at which time, according to my invention, the pusher bar will be disposed as shown in Figure 2. Power is then applied to shaft 24 to produce an advancing movement on chain 18 which is coupled to the leg 12 by the clip 48. This causes the loading plates and the packs carried thereon to be disposed between the pressing plates 26 of the press P. Thereafter, upon withdrawing movement of the loading plates, the pusher bar 30 on each plate is brought into the position shown in Figure 3 and is caused to advance against the edge of the pack and to hold the pack against withdrawing movement while the loading plates are being withdrawn upon outward movement of the plates and the frame through a reciprocal driving of the chain 18. In effect, at the time that the pusher bars come into operation, they maintain a fixed position to sweep the loading plates while the loading plates are withdrawing. When the plywood packs have been swept off the loading plates, the pusher bars are then reciprocally swept back across the loading plates and return to the normal position wherein face 31 is re-aligned with the upper surface of the plate 10.

Although I have shown and described certain specific embodiments of my invention, I am fully aware that many modifications thereof are possible.

I claim:

1. Loading mechanism, comprising: a plate forming a loading surface, a pusher bar having a face normally aligned with and forming an extension of said plate, a second surface on said bar angularly disposed to said normally aligned surface and forming therewith a nosing for the loading plate when the bar is in its normal position, and means for disposing said normally aligned surface at an angle to the loading surface of the plate, and for producing relative movement between said bar and said plate.

2. Loading mechanism, comprising: a horizontally disposed loading plate; reciprocal drive means located above to move parallel to each side edge of the loading plate, said drive means being movable to a point in advance of the inlet end of said loading plate; and means to reciprocate said drive means; a pusher bar having a work contact face extending between said drive means, and having a drag link fixedly secured thereto at each end; each said drag link being pivotally secured to one of said drive means and being of a length that the contact face of said pusher bar will lie in the plane of the upper face of said plate when said drive means is positioned in advance of the inlet end of said plate; and said bar and drag links being so proportioned and said plate and chain being so spaced that the contact face of said bar will be disposed angularly to and sweep said plate when the drive means is caused to move from the position in advance of the inlet end of said plate.

3. Loading mechanism, comprising: a horizontally disposed loading plate; reciprocal drive means located above to move parallel to each side edge of the loading plate, said drive means being movable to a point in advance of the inlet end of said loading plate; means to reciprocate said drive means; a pusher bar having a work contact face extending between said drive means, and having a drag link fixedly secured thereto at each end; each said drag link being pivotally secured to one of said drive means and being of a length that the contact face of said pusher bar will lie in the plane of the upper face of said plate when said drive means is positioned in advance of the inlet end of said plate; said bar and drag links being so proportioned and said plate and chain being so spaced that the contact face of said bar is disposed angularly to and sweep said plate when the drive means is caused to move from the position in advance of the inlet end of said plate; and camming means for so disposing said bar with respect to said plate.

PER F. SKOOG.